Feb. 26, 1957  G. E. BARNHART  2,783,106
SEALING RING

Filed June 27, 1955  2 Sheets-Sheet 1

GEORGE E. BARNHART
INVENTOR.

BY
AGENT

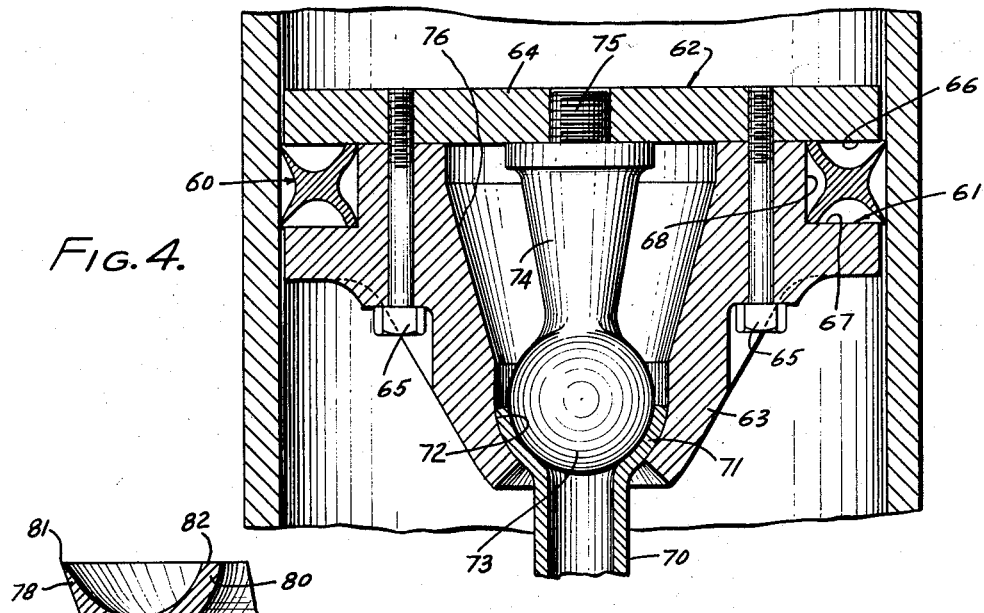
FIG. 4.
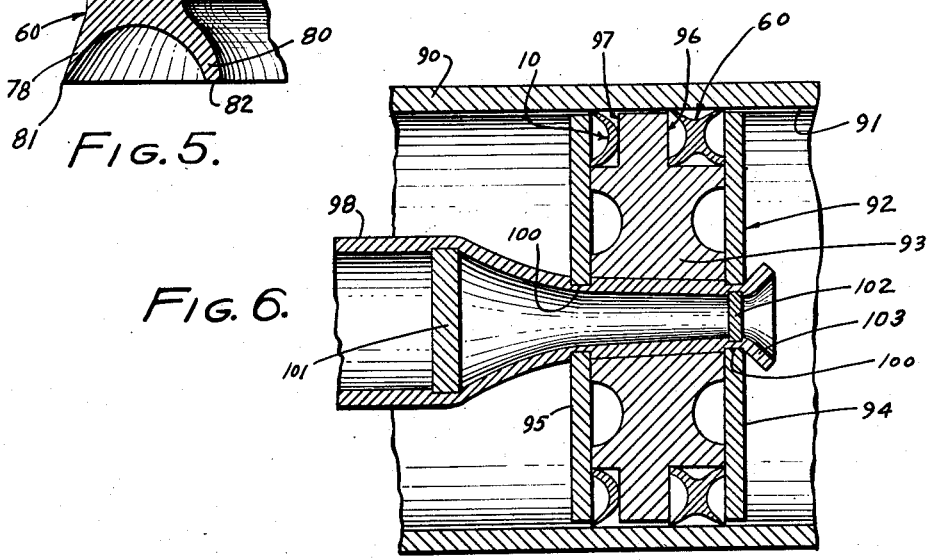
FIG. 5.
FIG. 6.
FIG. 7.
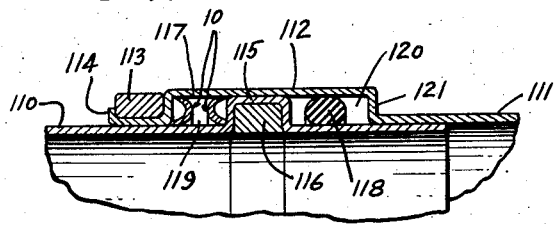
GEORGE E. BARNHART
INVENTOR.
BY
AGENT

United States Patent Office 2,783,106
Patented Feb. 26, 1957

2,783,106

SEALING RING

George E. Barnhart, Altadena, Calif.

Application June 27, 1955, Serial No. 518,281

9 Claims. (Cl. 309—33)

The device and article of this invention has general utility in the field of sealing between relatively movable members and relates to a sealing ring arrangement adapted for use in connection with members that are slidably disposed relative to each other.

While attempts have been made, for a considerable period of time, toward the provision of adequate sealing arrangements between relatively moving, generally annular members, contemporary necessities have dictated requirements for a sealing arrangement that will operate effectively in many situations and especially in instances wherein temperature changes, high pressures, thin-walled structures and the like are encountered. Prior devices intended for a similar purpose have taken the form of split sealing rings, as for example, those used in reciprocating engines, chevron type packings and/or sealing rings that are also usually split, O-rings of metal, rubber or other soft materials and the like. Each of these prior structures has presented serious difficulties in particular installational situations and has failed to be effective in the performance of the desired sealing action under all conditions of use.

For example, piston rings rely for their effectiveness upon the split opening in the periphery thereof and assume a permanent set in use. Additionally, as wear occurs, the space in the periphery of such rings becomes increased, thereby providing an opening through which fluids may escape. Obviously, this type of sealing arrangement would be ineffective in hydraulic cylinder applications or accumulators where high pressures must be held or in situations wherein fluids must be constantly maintained at a constant pressure level without pressure loss.

Chevron type sealing rings or packing also have serious disadvantages relative to the necessity for splits, slots or openings in the peripheries thereof and further relative to the generally soft material utilized in such structures and the deformation action thereof. Here, again, considerable wear and permanent sets are encountered preventing use thereof in high pressure situations. The rubber or like chevron packings and O-ring type seals are also both ineffective under changing temperature situations wherein deterioration due to the presence of heat and/or cold results in ineffective sealing properties.

Due primarily to recent developments in connection with aircraft, missiles, rockets and in other fields wherein high pressure, high temperature, low temperature and other conditions are encountered, it therefore has become extremely necessary for the provision of a new type of sealing structure that will meet these composite requirements and still be relatively light in weight, require relatively inexpensive weight and still effective support arrangements, and enable use in all sealing situations.

It is accordingly one important object of the invention to provide a novel sealing ring arrangement having properties and functional characteristics to overcome the before-mentioned difficulties in prior like structures and enable use in the various defined situations.

It is one other important object of the invention to provide a novel sealing ring having the property to distort longitudinally as deformation is applied in a radial or circumferential direction.

It is another important object of the invention to provide a sealing ring having features of novelty and physical characteristics to provide for sealing between relatively movable members and which consists of a metallic ring sealer which distorts longitudinally to enable wall pressure for sealing.

It is a further important object of this invention to provide a distortable sealing structure for relatively movable members wherein application of force of operating media thereto, by reason of relative movement or existence of fluid pressures, will act to deform the sealing arrangement in a direction of the material configuration thereof.

Still another object of the invention is to provide a metallic sealing member which is of greater diameter than a cylinder in which it is to be inserted, said greater diameter of the ring providing the ring with means to maintain pressure on the cylinder wall at all times.

It is a still further important object of the invention to provide a sealing arrangement wherein a sealing member associated therewith has a peripheral size creating a negative differential relative to structures with which such members are used.

Another important object of the invention is to provide a sealing ring having resilient characteristics to compensate for wear thereof and maintain constant pressure on cylinder walls along which such ring operates.

A further object of the invention is to provide a ring sealing means which is unbroken in its circumferential diameter, greater in diameter than the cylinder in which it is to be inserted and so shaped that it will distort in a longitudinal direction to permit its insertion into the cylinder, said longiudinal distortion acting as a means for maintaining a spring type of compression on the ring in order that the ring, may in turn, maintain pressure on the cylinder wall.

An object of the invention is also to provide a distortable metallic wall pressure exerting means with construction thereof permitting exertion of force by pressure operating media nad wherein said means is open and in contact with said pressure media.

Other and further important objects of the invention will become apparent from the disclosures in the following detailed specification, appended claims and accompanying drawings, wherein:

Fig. 4 is another sectional view showing an installational situation for another form of the sealing ring;

Fig. 5 is an enlarged fragmentary sectional view showing details of the cross sectional configuration of the other form of the sealing ring;

Fig. 6 is a sectional view showing an example of one application for various forms of sealing rings of the invention; and Fig. 7 is a further fragmentary sectional view showing the sealing arrangement applied to another example of relatively movable members.

Figure 3:
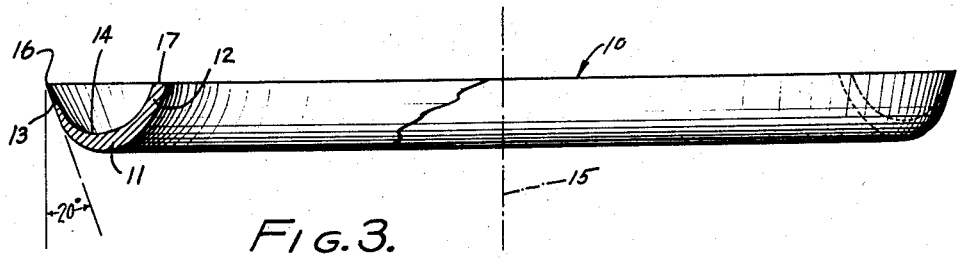
Fig. 3 is an enlarged detail view, partially in section, showing one form of the sealing ring hereof.

With reference to the drawings, and with reference primarily to Fig. 3, the sealing ring of this invention is indicated generally at 10 and comprises an annular body 11 that is generally C-shaped in cross section, with the detail configuration thereof being defined by the rotation of a generally hyperbolic conical section about a straight line, with this straight line lying in the plane of the hyperbolic section and the axis of the section lying in parallel relationship to the straight line.

Accordingly, therefore, the body 11 of the ring 10 comprises inner and outer annular portions 12 and 13, respectively, that are arranged in concentric relationship with interconnecting annular portion 14 being curved to connect the portions 12 and 13. The portion 13 is disposed at an angle of approximately 20° to a cylindrical plane arranged on an axis 15 of the ring 10. For a purpose to be further defined hereinafter, the body 11 of the ring 10, and the various portions 12, 13 and 14 thereof, are of varying wall thicknesses. The portion 13 is relatively thin, having a sharp annular outer edge 16 with the portion 12 being somewhat thicker than the portion 13 and having a blunt annular radially extending end surface 17. The interconnecting portion 14 may be similar to the portion 12 or larger than such portion, as may be desired in particular situations. The ring 10 may be made from any suitable metal, for example, formed as by any desired means, such as for example, rolling, spinning, drawing or the like, as dictated by particular installational, functional and requirement situations. The physical metallic characteristics of the ring 10 are such as to establish considerable resiliency in the material, with such characteristics being established by various known means such as, for example, by cold working of the material. In this connection, it is important that resilient properties of the ring be established in order that the desired characteristics may be inherently maintained.

Figure 1:
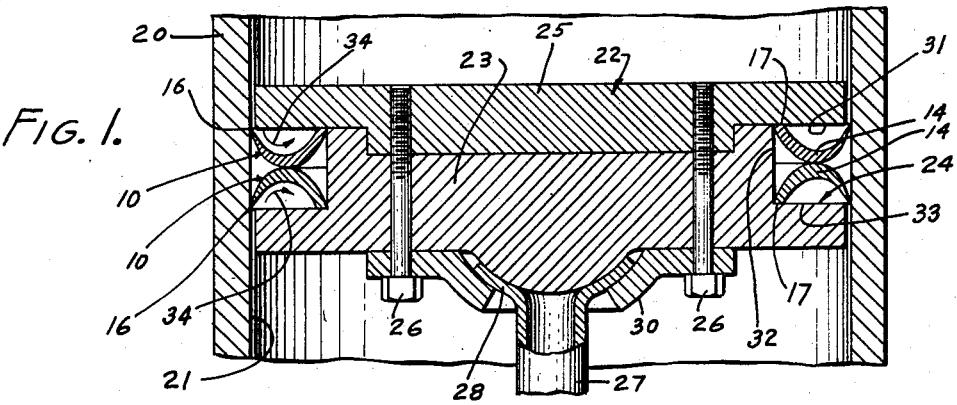
Figure 1 is a fragmentary sectional view showing one use situation for one form of sealing ring defined in this application.
Figure 2:
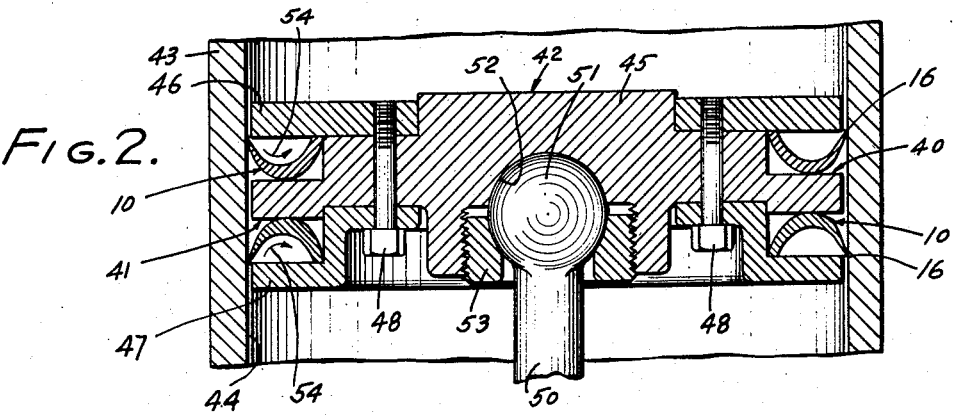
Fig. 2 is a sectional view similar to Fig. 1 showing another installational situation.

As shown in Figs. 1 and 2, the ring 10 may be utilized in various applications. With specific reference to Fig. 1, a plurality of such rings 10 may be utilized in back to back relationships. In this instance, a cylindrical member 20 having a cylindrical internal surface 21, is adapted to surround a piston or the like, indicated generally at 22. The piston comprises an annular body portion 23, having a peripheral open sided groove 24 formed thereon. A cover or plate member 25 is secured to the body 23 as by suitable bolts 26, for example, and provides a closure for the open side of the groove 24. An operating rod 27, having a flared end portion 28, is secured in operative relationship to the body 23 as by a universal fitting 30, which is also secured in position by means of the bolts 26.

The rings 10 are positioned in the annular groove 24, which is generally rectangular in cross section, with the ring 10 having a blunt end 17 thereof in abutting relationship to a surface 31 of the cover 25 which defines one side of the groove 24. Additionally, the inner peripheral edge of the ring 10 is in close approximation to a base surface 32 of the groove 24. The outer peripheral sharp edge 16 of the ring 10 is in contact with the cylindrical surface 21 of the member 20. The outer or lower ring 10 has its curved portion 14 disposed in contact with the like portion 14 on the upper ring, with the blunt end 17 thereof being in abutting relationship to a groove side surface 33 on the body 23. The rings 10 are accordingly faced in opposite directions and both of the outer peripheral sharp edges 16 are in contact with the surface 21 of the member 20.

Accordingly, application of force due to fluid pressure existing on either side of the piston 22 or due to relative movement of the piston 22 and the cylinder 20, the rings 10 will form an effective seal between the piston and the cylinder due to the particular configuration thereof. In practice, the outer peripheral diameter of the rings 10 are in excess of the diameter of the cylindrical surface 21 of the cylinder 20, with the rings thereby being biased radially outwardly by reason of their placement and confinement within the cylinder. A scraping action about the outer sharp peripheral edges 16 is accordingly presented upon movement of either the cylinder or the piston, with these rings tending to deform or creep in the direction of the arrows 34 in Fig. 1. This movement of the rings 10 will of course deform the outer peripheries thereof further radially outwardly, thus creating a more positive seal as forces acting upon the ring are increased. The abutment of the ends 17 of the rings with the surfaces 31 and 33, respectively, serve to limit this beforementioned movement of the rings. The particular metallic characteristics of the rings 10 enable deformation in the direction of the arrows 34 and thereafter return to normal position upon discontinuance of the force application thereto.

The particular construction of the piston 22 is by way of example only, inasmuch as various arrangements may be provided to enable insertion of the rings 10 in the groove 24. In some instances, however, it may be desirable to deform or manufacture the ring of this invention directly into a deformed groove in a member. Furthermore, while the present rings and supporting structure therefor are shown as being annular, it is entirely feasible to apply this construction to other configurations such as ellipses or generally square or rectangular cross sectional objects.

With reference to Fig. 2, it is to be noted that the rings 10 may be provided in different installational situations, whereas individually to support such rings. In this instance, the rings 10 are disposed in grooves 40 and 41 formed about the periphery of a piston indicated generally at 42. The piston 42 is disposed within a cylinder 43, having an inner cylindrical surface 44, and comprises a body 45 having a pair of covers 46 and 47 secured thereto by means of bolts 48. The covers 46 and 47 serve to provide the necessary sides for the grooves 40 and 41. In this form of the invention, an operating rod 50 is provided with a ball 51 on one end thereof, this ball being secured in a socket 52 by means of a locknut 53, thus permitting slight misalignment of the piston 42 upon movement thereof. The sharp outer ends 16 of the rings 10 are disposed in contact with the surface 44 of the cylinder 43 with the rings being disposed in the grooves 40 and 41 in a manner similar to that described in connection with the form of the invention shown in Fig. 1. In this instance, the rings 10 are adapted for deformation in the direction of the arrows 54, upon movement of the piston or cylinder in one direction or the other, whereby to provide the desired sealing characteristics between the piston and the cylinder.

With reference to Fig. 4, it is to be noted that the cylinder construction and principle of this invention may be applied to still other configurations of this sealing arrangement. In this instance, a composite dual sided sealing ring indicated generally at 60 and shown in detail in Fig. 5, is positioned within a groove 61 formed in the periphery of a piston 62. The piston 62 comprises a body 63 having a cover 64 secured thereto as by bolts 65 that may extend through the body 63 and threadably engage the cover 64. The cover 64 provides one side 66 for the groove 61 with another side 67 and the base 68 being provided by the body 63. The piston 62 is fitted with an operating rod 70 having a flared portion 71 residing in a socket 72, formed in one end of the body 63, and about a ball 73 carried by a stem 74 which is in turn threadably connected to the cover 62 as at 75 and disposed in a conical bore 76.

The composite ring 60 includes a body 77 that is similar in construction to the composite ring structure defined for use in connection with the form of the invention shown in Fig. 1. In this particular arrangement, the body 77 includes a pair of sealing structures that are integrally connected and include outer annular portions 78 and inner annular portions 80. Annular peripheral sharp edges 81 are defined on the outer ends of the portions 78, while the portions 80 have annular blunt ends 82. For all purposes, the composite ring 60 functions in substantially an identical manner to the individual rings 10, with the various portions 78 and 80 being deformed upon application of force thereto also in a similar manner. The composite ring 60 is adapted primarily for use in situations requiring relatively high pressures or other operating characteristics.

In Fig. 6, it is to be noted that the sealing ring arrangements of the invention may be combined to provide the necessary sealing along specific surfaces. In this form, a cylinder 90, having an internal cylindrical surface 91, has a piston therein which comprises a body 93 having plates 94 and 95 disposed on each side thereof with the plates and the body cooperating to provide axially spaced peripheral grooves 96 and 97 about the piston 92. In this particular form of the invention, an operating rod 98 is connected to the piston 92 by expansion thereof into openings 100 formed axially in the plates 94 and 95. A portion of the rod 98 is retained in configuration by means of a partition member 101 positioned with the rod and adjacent the major portion thereof, with a further partition member 102 being disposed in the rod concentrically with the opening 100 formed in the plate 94. Additionally, the outer end of the rod 98 may be outwardly flared as at 103. Thus the rod 98 may be retained in connection with the piston 92 without the use of bolts or the like, with the peripheral grooves 96 and 97 being defined and maintained on the outer sides thereof by means of the plates 94 and 95, which are also secured by the same means as holds the rod 98 in position. As shown, one of the rings 10 may be positioned in the groove 97, while one of the rings 60 may be positioned in the groove 96, thus to provide for dual sealing when the piston is moved leftwardly, as seen in Fig. 6, and for lighter sealing as by portions of the ring 60 when the piston 92 is moved rightwardly.

The various rings disclosed for use in connection with the forms of the invention shown in Figs. 4 and 6 all have their outer diameters initially formed somewhat larger than the diameters of the surfaces along which they are designed to operate, for the purpose described hereinbefore.

In Fig. 7, a still further modified use situation for the sealing rings of the invention is shown, as may be applied to telescopically arranged, thin walled tubular members. As shown, an inner tubular member 110 is slidably disposed within an outer tubular member 111, with the tubular member 111 being provided with an annular elongated flanged portion 112. One end of the flanged portion 112 has disposed thereabout a connecting ring 113 that may be disposed thereon in any suitable manner as, for example, by spinning, rolling, drawing or the like, and retained in position by means of an outwardly disposed portion 114. Likewise, the tubular member 110 has an outwardly disposed annular portion 115 in which a unitary ring 116 is positioned in much the same manner as defined in connection with the ring 113. A pair of the sealing rings 10 are disposed within an annular chamber 119 defined between the portion of the flange 112 adjacent the ring 113 and one side of the portion 115. The sealing rings 10 are adapted to face in opposite directions with the sharper outer peripheries thereof being engageable with an inner surface 117 of the flanged portion 112. For additional sealing purposes, a resilient O-ring or the like 118 may be positioned in an annular space 120 defined between another side of the portion 115 of the tube 110 and one end 121 of the flanged portion 112. Thus, upon telescopic movement of the members 110 and 111 by reason of changes in temperature, pressure or the like, or by movement of adjacently attached objects, the sealing rings 110 will provide the necessary seal between these members. Additionally, it is to be noted that the members 110 and 111 may be made from exceptionally thin walled material and that sealing therebetween can nevertheless be provided, utilizing the principles set forth in this invention.

Accordingly, it will be seen that the invention has utility in all situations requiring the sealing of one movable member relative to another and wherein unsatisfactory results have been obtained with prior devices designed for a similar purpose. Furthermore, it is to be noted that due to the particular metallic characteristics, the elasticity of the material of the sealing rings 10 and 60 remains the same before and after deformation or creeping thereof, as defined hereinbefore, or after insertion with, without or about other members. Actually, the sealing rings provide primarily at least three points of sealing, these being at the outer peripheral sharp edges thereof, although only two of such points may be used, the point of abutment of the inner peripheral portions of the ring with a side of an associated groove and the contact point between the curved interconnecting portions of the rings with another side groove, another ring or other structure.

It may be seen that the present ring construction may also be utilized in connection with the sealing of various types of openings in that the piston associated therewith may be formed as an integral part of the ring and/or there may be established a web interconnecting the inner peripheries thereof. Upon insertion in or about the opening, a structure of this type will provide the necessary seal therein even though frequent removal, attachment or insertion are encountered. This action is accomplished by reason of the particular metallic characteristics of the ring material and the particular configuration of the ring.

Having thus described the invention and the present embodiments thereof, it is desired to emphasize the fact that many embodiments may be resorted to in a manner limited only by a just interpretation of the following claims.

I claim:

1. A sealing ring arrangement comprising: an annular ring having a semi-circular surface; at least one relatively thin outer annular portion lying at one end of said surface; and an inner concentric annular portion of greater thickness than said outer annular portion and lying at the other end of said surface, said portions being integral and directed in a common axial direction whereby, upon disposition in a piston groove, to permit deformation of said ring, when under pressure, in a direction extending from one of said portions to the other.

2. In a sealing ring arrangement adapted for use between relatively movable members: an annular integral ring; a groove in one of said members, said ring being adapted for disposition in said groove; and concentric portions in said ring, said portions being interconnected to define a generally hyperbolic toroidal configuration, said portions being of different radial thicknesses whereby, upon application of force to one side of said ring to permit deflection thereof in a direction from one of said portions to another.

3. In a sealing ring arrangement adapted for use between relatively movable members: an annular integral ring; a groove in one of said members, said ring being adapted for disposition in said groove; and concentric portions in said ring, said portions being hyperbolically progressively interconnected about a circular line to define a generally hyperbolic toroidal configuration, said portions being of different radial thicknesses whereby, upon application of force to one side of said ring to permit deflection thereof in a direction from one of said portions to another.

4. A sealing ring arrangement for use between relatively movable members comprising, in combination: an annular integral ring; an annular groove in one of said members; an internal surface on another of said members, said ring being disposed in said groove with an outermost portion thereof in contact with said surface, said ring having a general configuration defined by rotation of a hyperbolic conical section about a straight line with said line lying in the plane of said section, and an axis of said section being parallel to said line, portions of said ring being thereby concentrically disposed; and a varying thickness in a wall of said ring, said outermost of said portions having a thickness less than that of other of said portions of said ring, an innermost of said portion of said ring disposed in abutting relationship with one radially extending wall of said groove.

5. A sealing ring arrangement for use between relatively movable members comprising, in combination: an annular integral ring; an annular generally rectangular in cross section groove in one of said members; an internal annular surface on another of said members, said ring being disposed in said groove with an outermost portion thereof in contact with said surface, said ring having a generally C-shaped configuration defined by rotation of a generally hyperbolic conical section about a straight line with said line lying in the plane of said section, and an axis of said section being parallel to said line, portions of said ring being thereby concentrically disposed; and a varying thickness in a wall of said ring, said outermost of said portions having a normal diameter in excess of the diameter of said internal annular surface of said another of said members and a thickness less than that of other of said portions of said ring, an innermost of said portions of said ring disposed in abutting relationship with one radially extending wall of said generally rectangular groove.

6. A sealing ring arrangement, comprising, in combination: an annular ring unitary throughout; at least one relatively thin outer annular portion; an inner concentric annular portion of greater thickness than said outer annular portion, said portions being directed in a common axial direction.

7. A sealing ring arrangement comprising, in combination: a unitary annular ring; a retainer for said ring; at least one relatively thin outer annular portion; and an inner concentric annular portion of greater thickness than said outer annular portion, said portions being integral, directed in a common axial direction and being adapted for distortion, upon application of force thereto, in a longitudinal direction whereby to permit insertion thereof in a tubular structure and constant spring sealing between said retainer and said structure.

8. A sealing ring arrangement for use between relatively movable members comprising, in combination: an annular integral ring; an annular groove in one of said members; an internal surface on another of said members, said ring being disposed in said groove with a pair of outermost portions thereof in contact with said surface, said ring having a general configuration defined by rotation of a pair of oppositely faced hyperbolic conical sections about a straight line with said line lying in the plane of said sections, and axes of said sections being parallel to said line, dual portions of said ring being thereby concentrically disposed; and a varying thickness in a wall of said ring, said outermost of said portions having a thickness less than that of other of said portions of said ring, an innermost of said portions of said ring disposed in abutting relationship with one radially extending wall of said groove.

9. A sealing ring arrangement for use between relatively movable members comprising, in combination: an annular integral ring; an annular generally rectangular in cross section groove in one of said members; an internal annular surface on another of said members, said ring being disposed in said groove with a pair of outermost portions thereof in contact with said surface, said ring having a generally double, back to back, C-shaped configuration defined by rotation of a pair of oppositely faced generally hyperbolic conical sections about a straight line with said line lying in the plane of said sections, and axes of said sections being parallel to said line, portions of said ring being thereby concentrically disposed; and a varying thickness in a wall of said ring, said outermost of said portions having a normal diameter in excess of the diameter of said internal annular surface of said another of said members and thicknesses less than that of other of said portions of said ring, innermost of said portions of said ring disposed in abutting relationship with two radially extending walls of said generally rectangular groove.

References Cited in the file of this patent

UNITED STATES PATENTS

| 1,511,397 | Christenson | Oct. 14, 1924 |
| 1,721,325 | Wilson | July 16, 1929 |
| 2,107,241 | Freer | Feb. 1, 1938 |

FOREIGN PATENTS

| 711,125 | France | Sept. 4, 1931 |